C. H. McCormick.

Mower.

Reissued May 24, 1853.
Reissued Dec. 21, 1858.
Reissued Sep. 20, 1859.

No 821

Inventor
Cyrus H. McCormick.

Sheet 2-2 Sheets.

C. H. Mc Cormick.

Mower.

Reissued May 24, 1853.
Reissued Dec. 21, 1858.
Reissued Sep. 20, 1859.

No 821

Inventor
Cyrus H. McCormick

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 821, dated September 20, 1859.

DIVISION F.

*To all whom it may concern:*

Be it known that I, CYRUS H. McCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
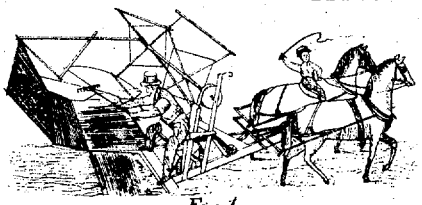
Figure 2:
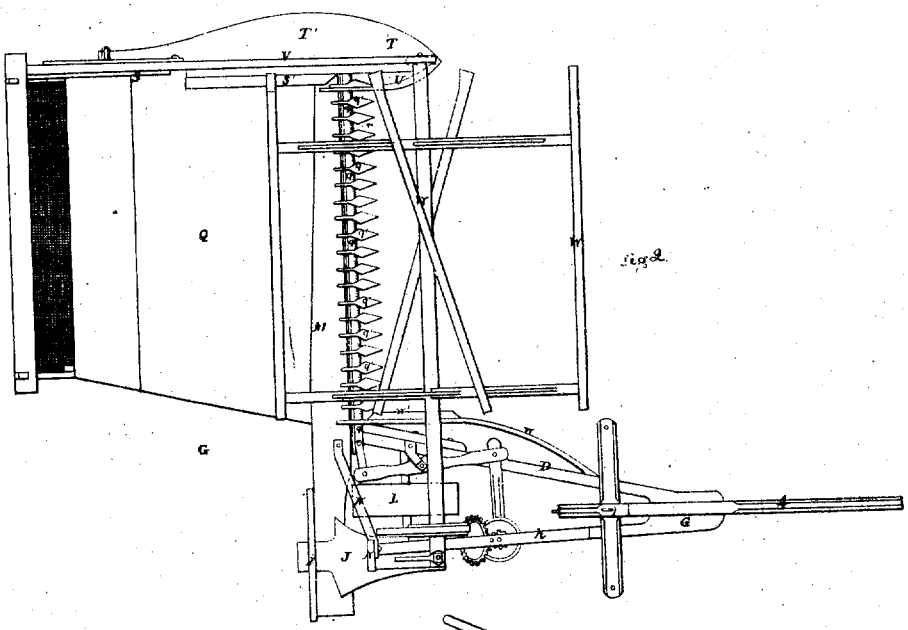
Figure 3:
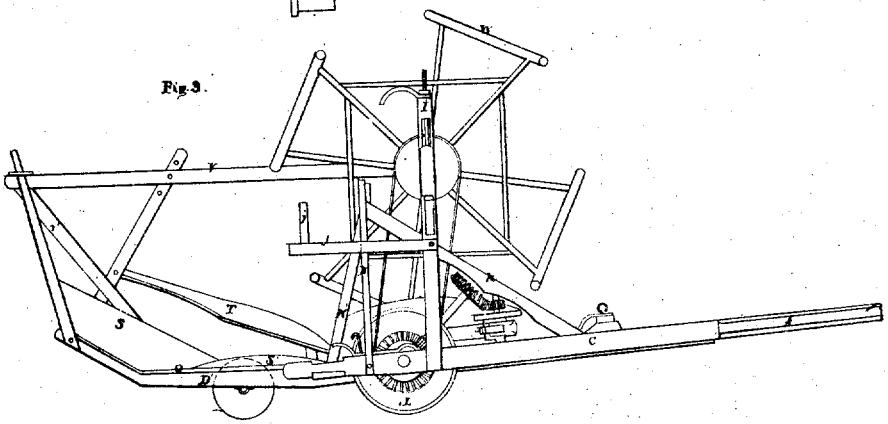
Figure 4:
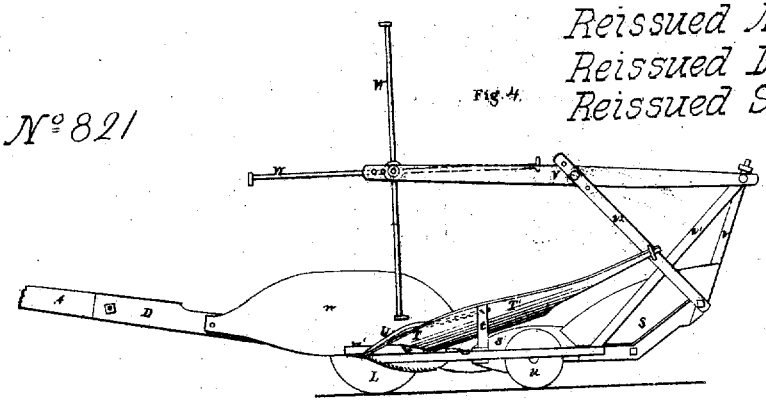
Figure 5:
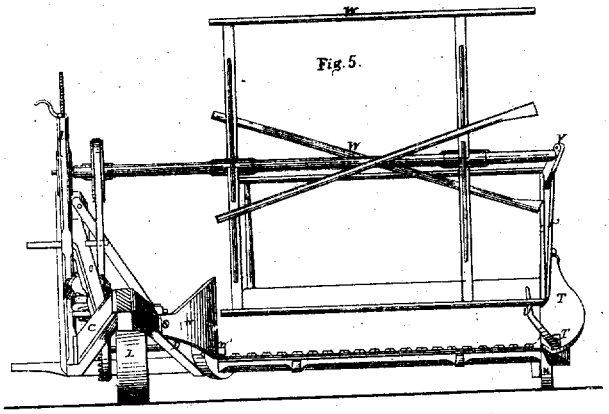
Figure 6:
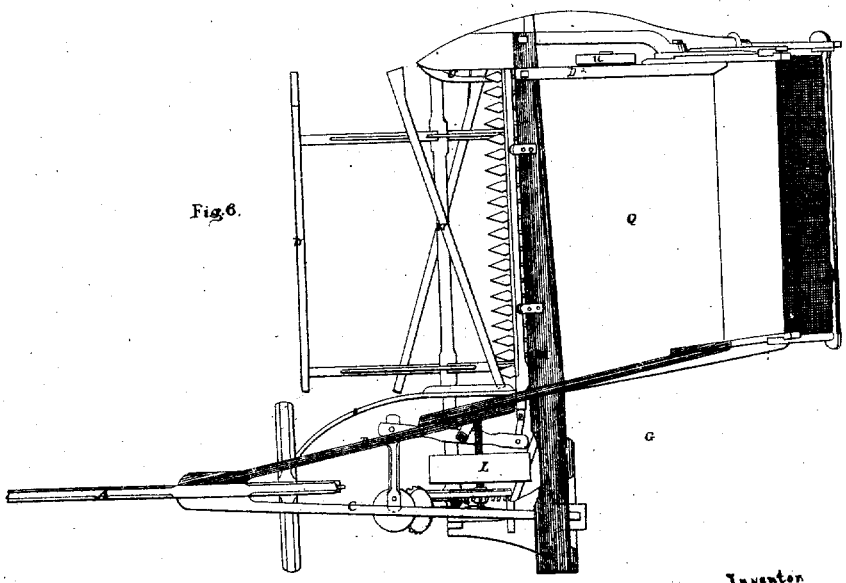

Figure 1 represents in perspective a side-draft-reel reaping-machine embracing my said improvement. Fig. 2 represents a plan of such a machine, as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached, and which runs next the stubble, I call the "inner" side, and the opposite side of the machine, which runs next the uncut grain, I call the "outer" side of the machine.

To contrive a reaping-machine to cut grain clean and gather it as cut without waste upon a platform in a quantity sufficient for a sheaf I have found to be exceedingly difficult. In the attainment of these objects practically, I have found it necessary, among other things, that the grain at the front of the outer side of the machine should be parted by a pathway or space made through it by a wedge or wedge-shaped instrument called a "divider," which will raise outward-leaning stalks on the outer margin of the swath, so as to bring them within reach of the reel. In grain that stands well and the tops of which are not entangled, the division is easily effected; but when the grain is entangled so that the tops of the stalks inside of the line of division lean over among those which are outside of that line, then it becomes necessary to employ a reel to aid the divider in completing the separation of the inside from the outside grain, and in bringing the former within the outer line of the swath by causing the outer ends of the bars or ribs of the reel to revolve in such relation to the inside of the divider that the outward-leaning stalks of grain on its inside which have been raised will be brought within the range of and be swept back by the reel-bars, and thus pulled away from the outside stalks and turned onto the platform. This co-operating action of the reel with the divider should not take place too far in advance of the cutters, because if it did the reel would be too far forward to gather the grain properly upon the platform. To place the reel in the position in which it can best perform those different functions renders it necessary that it should be supported by other means than a standard or post placed at or near the outer end of the finger-beam. The means for its support should be such as will not impede the passage round onto the platform of long stalks of grain whose tops lean outward over the divider and reach behind it as they are swung round under the operation of the reel in bringing them within the line of the swath to gather them upon the platform. To meet this exigency I support the reel on an arm or bearer secured to the rear portion of the outside of the frame far enough back to be behind the reach of the heads of the outward-leaning stalks of grain as they are brought onto the platform, and extending forward to the reel-shaft and high enough above the divider and platform not to obstruct the entrance of the grain onto the platform; but this substitution of the arm-support from the rear of the frame for the post-support near the end of the finger-beam is not alone sufficient. To avoid waste it is also necessary to combine with the outer side of the platform some contrivance that shall retain the cut grain and prevent it from falling off that side of the platform, and yet leave above it an open gathering-space between the surface of the platform and the standing grain through which the outward-leaning stalks may, without obstruction, be gathered by the reel onto the platform.

In the drawings I have shown this improvement applied to a McCormick reaping-machine, but deem it unnecessary to describe in detail any more of that machine than is needful to a proper understanding of this improvement.

In the accompanying drawings, M represents a strong beam, called the "finger-piece" or "finger-beam." The cutting apparatus is placed in front and the platform in the rear of the outer portion of this finger-beam. At the outer end of the finger-beam there is a separator, T, or long-pointed finger, which projects in advance of the cutter to divide the grain that is to be immediately cut from that which is to be passed uncut, and to raise outward-leaning grain to bring it within reach of the reel-ribs. The dividing function of the separator or divider T terminates at the line of the front of the platform Q, where the stalks are severed; but I have extended the board (of which in this case the separator is formed) backward along the outer side of the platform for the purpose of making the extended portion T′ of the board form a shield for the grain-wheel, and also a fender to bear off the standing grain. This extended portion T′ of the dividing-board likewise makes with the boards S S′ placed on the platform, as shown in the drawings, a grain-guard at the outer side of the platform.

The reel W is upheld at the outer end by an arm or beam, V, which is supported by struts on the frame that carries the platform, and is further supported by a brace, thus avoiding the use of a standard or post at that side, (against which the grain strikes before it is separated and brought onto the platform,) and securing an unobstructed gathering-space between the reel and standing grain over the grain-guard S S′ T′ and the divider T for the stalks of the outward-leaning grain to swing through in coming onto the platform, while the cut grain is retained and guarded from dropping off. The inner end of the reel has its bearing in a standard, I, rising up from the inner side of the frame. So long as the reel is supported in such a manner as to sustain such relations to the divider, grain-guard, and platform as to secure an unobstructed space between the surface of the platform and outside standing grain, it is of no importance, so far as this invention is concerned, what may be the form or arrangement of the reel-support, as it forms no part of the invention claimed under this patent, the gist of which is the relation of the grain-guarded platform, reel, and divider to each other, which leaves an open gathering-space, as before mentioned, for the unobstructed entrance of outward-leaning stalks in the swath being cut, and retains the cut grain on the platform.

What I claim under this patent as my invention is—

The combination of the grain-guarded platform to receive and retain the cut grain with the divider and the reel, the whole arranged substantially in the manner and for the purposes described.

In witness whereof I have hereunto signed my name.

C. H. McCORMICK.

In presence of—
P. H. WATSON,
JOHN S. HOLLINGSHEAD.